United States Patent
Herve et al.

(10) Patent No.: US 9,701,778 B2
(45) Date of Patent: Jul. 11, 2017

(54) AQUEOUS DISPERSIONS OF POLYURETHANE RESINS BASED ON ROSIN

(71) Applicant: Arkema France, Colombes (FR)

(72) Inventors: Gregoire Herve, Verberie (FR); Frank Cogordan, Paris (FR)

(73) Assignee: Arkema France, Colombes (FR)

( * ) Notice: Subject to any disclaimer, the term of this patent is extended or adjusted under 35 U.S.C. 154(b) by 130 days.

(21) Appl. No.: 14/388,291

(22) PCT Filed: Mar. 27, 2013

(86) PCT No.: PCT/FR2013/050665
§ 371 (c)(1),
(2) Date: Sep. 26, 2014

(87) PCT Pub. No.: WO2013/144510
PCT Pub. Date: Oct. 3, 2013

(65) Prior Publication Data
US 2015/0119521 A1     Apr. 30, 2015

(30) Foreign Application Priority Data

Mar. 30, 2012 (FR) ..................................... 12 52898

(51) Int. Cl.
| | | |
|---|---|---|
| C08G 18/08 | (2006.01) |
| C08G 18/34 | (2006.01) |
| C08G 18/36 | (2006.01) |
| C08G 18/42 | (2006.01) |
| C08G 18/68 | (2006.01) |
| C08G 18/75 | (2006.01) |
| C08L 67/00 | (2006.01) |
| C08L 75/06 | (2006.01) |
| C09D 5/02 | (2006.01) |
| C09D 175/06 | (2006.01) |
| C09D 175/14 | (2006.01) |

(52) U.S. Cl.
CPC ......... *C08G 18/36* (2013.01); *C08G 18/0823* (2013.01); *C08G 18/348* (2013.01); *C08G 18/4288* (2013.01); *C08G 18/686* (2013.01); *C08G 18/755* (2013.01); *C08L 67/00* (2013.01); *C08L 75/06* (2013.01); *C09D 5/022* (2013.01); *C09D 175/06* (2013.01); *C09D 175/14* (2013.01)

(58) Field of Classification Search
CPC .... C08G 18/36; C08G 18/868; C08G 18/755; C08G 18/0823; C08G 18/4288; C08G 18/348; C08G 18/68; C08G 18/3486; C08L 67/00; C08L 75/06; C09D 175/06; C09D 175/14; C09D 5/022
See application file for complete search history.

(56) References Cited

U.S. PATENT DOCUMENTS 3,644,237 A    2/1972  Crawford et al.
4,277,380 A    7/1981  Williams et al.

FOREIGN PATENT DOCUMENTS

DE    2323546 A1     5/1973
JP    07-165855  *  6/1995

OTHER PUBLICATIONS

Machine English translation of JP 07-165855, Masuda et al., Jun. 1995.*

* cited by examiner

*Primary Examiner* — Patrick Niland
(74) *Attorney, Agent, or Firm* — Lynn B. Morreale

(57) ABSTRACT

The invention relates to rosin-based polyurethane resins derived from hydroxylated fatty polyesters modified with rosin, where the polyesters are bio-based, The invention also relates to aqueous dispersions of these resins, and the use of these resins in aqueous coatings.

19 Claims, 2 Drawing Sheets

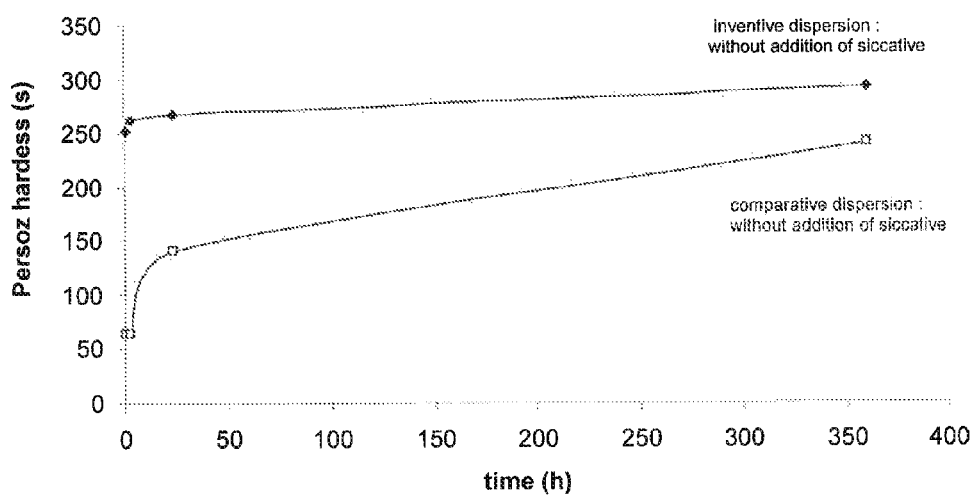
Fig. 1: Comparative development of hardness over time of a dispersion according to the invention and of a dispersion according to the prior art (WorleeSol® E 150 W : comparative)

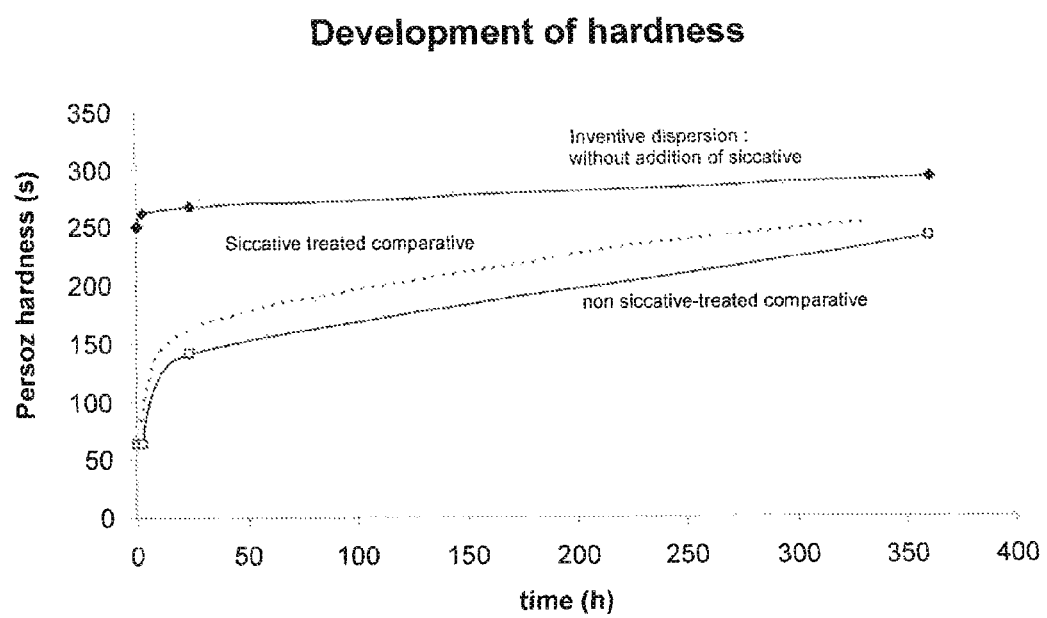
Fig. 2 : Comparative development of hardness over time of a dispersion according to the invention (non siccative treated) with a commercial dispersion of the prior art (WorleeSol® E 150 W : siccative-treated comparative and non siccative-eated comparative) with and without siccative (Additol® VXW 6206 added to 1.5 % by weight on dry resin)

AQUEOUS DISPERSIONS OF POLYURETHANE RESINS BASED ON ROSIN

CROSS-REFERENCE TO RELATED APPLICATIONS

This application is a national stage application under 35 U.S.C. §371 of PCT/FR2013/050665, filed Mar. 27, 2013, which claims benefit to French patent application FR 12.52898, filed Mar. 30, 2012.

FIELD OF THE INVENTION

The invention relates to a rosin-based polyurethane resin, obtained from a hydroxylated fatty polyester modified with rosin, which polyester is of bio-based origin, and also relates to aqueous dispersions of these resins and to the uses thereof in aqueous coatings.

BACKGROUND OF THE INVENTION

Alkyd resins in organic solvent medium, otherwise known as solvent-based media, are resins that have been well known for a long time by those skilled in the art, and are generally used in decorative and industrial coatings and paint formulations. In response to questions of ease of use, odor and toxicity, specific alkyd resin emulsions have been developed and marketed for about twenty years, with advantageous performance levels in terms of gloss, drying, appearance/color, stability and odor. A conventional implementation technique solution, used for forming alkyd resin emulsions that are stable over time, consists in using a combination of a nonionic surfactant with an anionic surfactant as described in WO 2008/076 360.

Despite these improvements, certain parameters and performance qualities remain to be improved, such as the resistance to yellowing, the resistance to blocking, the hardness and the drying.

In the field of coatings, in particular for decorative applications, commercial urethane-treated alkyd resin dispersions exist, for instance WorleeSol® E 150 W supplied by Worlee, which are known for rapid development of hardness and for affording saving in terms of initial drying in paints composed of alkyd resin dispersions, optionally mixed with other aqueous dispersions such as latices. However, these urethane-treated dispersions are subject to problems of development of yellowing over time that are more pronounced than in the case of alkyd resin and acrylic dispersions. Furthermore, the levels of gloss are reduced when compared with alkyd resin dispersions or (worse) acrylic dispersions, which is why (high-quality) gloss paint formulations nowadays contain a small proportion of urethane-treated dispersion. In parallel, there is a need to further increase the level of physical drying, in particular the initial drying (drying during the first hours after application), and if possible, without the need for a toxic siccative agent such as cobalt or lead derivatives.

Moreover, the environmental constraints and the challenges linked to sustainable development increase the need for linked aqueous resins and dispersions, which have a reduced content of VOC produced with starting materials of renewable (or non-fossil) origin.

The resin of the invention allows the preparation of aqueous polyurethane dispersions based on fatty polyesters which satisfy these needs or overcome the drawbacks of the mentioned known dispersions.

SUMMARY OF THE INVENTION

The solution of the invention is first a solution that is friendly to man and to his environment as a result of the absence both of organic solvents with a low content of VOC (volatile organic compounds) in the aqueous dispersion and the absence of siccative agents, also known as siccatives, on drying, but also by the choice of the essential starting materials for the fatty polyester serving as a basis for the polyurethane resin, insofar as a high content of these starting materials is of renewable and durable origin and which may lead to chemical structures that are more readily biodegradable.

Said aqueous binders according to the present invention are predominantly prepared from rosin and natural fatty substances. This advantage is notable since, in certain cases, the proportion of renewable starting materials in the polyol fatty polyester serving as the basis for the polyurethane resin reaches a content of 100% relative to the overall composition of this fatty polyester resin. The durable nature of said resin is linked to the durable and seasonal availability of said starting materials. These same causes also make it possible to limit the environmental impact via a reduced carbon footprint and an improved life cycle. These two parameters reflect the impact of the manufactured products on the environment and health. The use of "renewable" or "bio-based" resources in particular makes it possible to limit the emissions of greenhouse gases such as carbon dioxide.

Thus, the specific resin of the invention, which makes possible these dispersions and associated technical performance qualities, is based on a fatty polyester (non-oxidizable or oxidizable such as an alkyd resin) which has been urethane-treated (with formation of polyurethane based on this polyester).

This base fatty polyester resin, of bio-based origin and, in particular, alkyd resin and more particularly short oil or middle oil alkyd resin<60%, uses a high content of starting materials of renewable origin and allows specific performance qualities, in particular as regards the development of hardness over time after application. Similarly, reduction of yellowing may be obtained. In particular, the novel polyurethane resin based on this polyester may be used as a binder in aqueous compositions for aqueous decorative or industrial coatings that are capable of hardening in air with or without siccative agent, preferably without siccative agent.

The combination of the urethane groups with said specific polyester allows additional particular advantages such as good adhesion to the substrate, good flexibility, abrasion resistance, excellent blocking resistance and good mechanical strength in general.

Among the advantages of the present invention over the prior art, mention may be made in particular of its aptitude toward physical drying, which may be obtained in the same manner with or without addition of siccative agent, such as cobalt derivatives. More particularly, the product of the invention has the specific capacity for drying and hardening very rapidly within the first hours of application, as shown by the results and graph below (novel urethane-treated polyester or polyurethane versus WorleeSol® E 150 W). It should be noted, in particular, that the product achieves more than 85% of its hardness potential after only 1 hour of application, without any addition of siccative agent.

A further advantage during the drying of the dispersions of resins according to the present invention is the faster and more intense development over time of stable hardness, without the need for addition of a siccative such as Co (cobalt) or the like.

BRIEF DESCRIPTION OF THE DRAWINGS

FIG. 1 is a graph of the comparative development of hardness over time of a composition of the invention and a comparative composition.

FIG. 2 is a graph of the comparative development of hardness over time of a composition of the invention and a comparative composition with and without siccative.

DETAILED DESCRIPTION OF THE INVENTION

The invention first covers a specific linear or branched polyurethane resin based on a specific fatty polyester, of bio-based origin, more particularly based on a bio-based alkyd resin (oxidizable polyester).

Next, the invention relates to an organic binder composition based on said resin.

The invention relates more particularly to an aqueous dispersion of said polyurethane resin.

Another subject of the invention relates to a process for preparing said resin in the form of an aqueous dispersion.

Another subject relates to a coating composition which comprises said resin or resin dispersion.

Finally, the invention relates to a substrate coating which results from said resin or resin dispersion.

Thus, the first subject of the invention relates to a linear or branched polyurethane resin based on fatty polyester, in particular based on alkyd resin, obtained from at least one hydroxylated fatty polyester A), with:
- said polyester A) being the product of reaction of a) an alcohol component with b) an acid component, which acid component b) comprises b1) at least one fatty acid, said fatty acid being chosen from b1.1) at least one oxidizable fatty monoacid and/or polyacid, comprising at least one oxidizable unsaturation or b1.2) at least one non-oxidizable fatty monoacid and/or polyacid or b1.3) at least one mixture of fatty acids b1.1) and b1.2) and said component b) also comprising b2) rosin and/or rosin derivatives bearing at least one carboxylic acid function, said rosin and/or derivatives b2) representing from 30% to 85%, preferably from 35% to 75%, more preferentially from 40% to 75% and even more preferentially from 45% to 75% by weight relative to the total weight of A)
- optionally, said polyester A) having a zero oil length (0%) or an oil length of between 0 and 60%, preferably from 0 to 50% and more preferentially from 0 to 40%
- optionally, said polyester A) having a weight ratio of oxidizable fatty acids (monoacids) b1.1) relative to the overall fatty acids b1.1) b1.2) of 0 or greater than 0 and ranging up to 1 or globally from 0 to 1 and with said polyurethane resin being the product of reaction of said polyol polyester A) with:
B) at least one diol comprising an acid function, chosen from carboxylic, sulfonic, phosphonic or phosphinic (preferably carboxylic, sulfonic or phosphonic and more preferentially carboxylic), said acid function optionally being partially or totally neutralized in salt form with a "weak" base (of $pk_a<14$), preferably chosen from amines and phosphines and C) at least one polyisocyanate, of functionality ranging from 2 to 3, preferably diisocyanate, more preferentially cycloaliphatic.

In point of fact, said polyurethane resin is the product of polyaddition reaction of an alcohol component, comprising the hydroxylated fatty polyester A) and of the diol B) with an isocyanate component consisting of at least one polyisocyanate C). No crosslinked structure is present in said resin that may be used for the aqueous resin dispersion. A resin of linear structure is obtained for a linear and not more than difunctional fatty polyester A), with a polyisocyanate C) chosen from diisocyanates.

The NCO/OH ratio is less than or equal to 1. When this ratio is less than 1, said polyurethane resin bears reactive hydroxyl residual functions that may serve for a crosslinking reaction during the separate step, of application (final use) for crosslinkable coatings.

The polyisocyanate C) may be chosen from all aliphatic, cycloaliphatic or aromatic polyisocyanates that are suitable for preparing polyurethanes by reaction with a polyol. They may be diisocyanates or triisocyanates or derivatives of these isocyanates such as diisocyanate oligomers or precondensates or prepolymers bearing isocyanate functions with a functionality ranging from 2 to 3. These polyisocyanates may optionally be in a form blocked with a blocking agent which is labile under the reaction conditions.

As examples of suitable diisocyanates, mention may be made, without limitation, of the following: toluene 2,4- and 2,6-diisocyanate (TDI), isophorone diisocyanate (IPDI), hexamethylene diisocyanate (HDI), trimethyl hexamethylene diisocyanate (TMDI), 4,4'-diphenylmethane diisocyanate (MDI), 4,4'-dicyclohexyl-methane diisocyanate (H12MDI), 3,3'-dimethyl-4,4'-biphenyl diisocyanate, 1,4-benzene diisocyanate, 1,5-naphthalene diisocyanate (NDI), cyclohexane 1,4-diisocyanate, dodecane diisocyanate, m-tetramethylenexylylene diisocyanate, 4,6-xylylene diisocyanate.

As examples of suitable triisocyanates, mention may be made of the following: toluene triisocyanate, timer TDI (such as Desmodur® R from Bayer), HDI trimer (such as Desmodur® N from Bayer).

Preferably, said polyisocyanate is a diisocyanate and in particular cycloaliphatic, such as IPDI, cyclohexane 1,4-diisocyanate or 4,4'-dicyclohexyl-methane diisocyanate (H12MDI).

The diol B) is a diol bearing an acid function which may be in partially or totally neutralized (salified) form. The preferred acid function is chosen from carboxylic, sulfonic and phosphonic and more particularly carboxylic or sulfonic acid. As suitable preferred examples, mention may be made of: dimethylolpropionic acid or the equivalent by replacing the carboxylic acid with sulfonic or phosphonic acid.

As regards the polyol fatty polyester resin A) which is the base of this polyurethane resin, preferably, this polyester has an acid number of less than 10, preferably less than 6, and a hydroxyl number ($I_{OH}$) of at least 25, preferably from 50 to 150, and it has a calculated number-average molecular weight Mn ranging from 250 to 10 000 and preferably from 250 to 6000. The calculated Mn, in the absence of another valid indication for all of the invention, corresponds to the Mn calculated from the OH and acid numbers and the mean functionality. The acid numbers are measured according to the titration method ISO 2114 and the hydroxyl numbers are calculated as a function of the amounts of material introduced (OH/COOH mole ratio).

Said acid component b) and said polyester resin A) may comprise, in addition to said fatty acid b1), in addition to said rosin and/or in addition to said rosin derivatives b2), at least one acid compound b3) bearing at least one carboxylic acid function, with, optionally in addition, a hydroxyl function and an overall functionality (carboxyl+optionally OH) of from 2 to 3, with b3) being chosen from: b3.1) saturated polyacids and/or b3.2) ethylenically unsaturated polyacids or b3.3) hydroxy acids.

Said acid compound b1) may be, according to a more particular case, a non-oxidizable fatty polyacid b1.2) and, preferably, it comprises at least one $C_{36}$ fatty acid dimer and/or at least one $C_{54}$ fatty acid trimer.

The term "fatty acid" defined according to the invention means a $C_{12}$ to $C_{54}$ carboxylic acid.

The term "oil length" as used in the present invention means the weight % relative to the total weight of the fatty polyester resin, of the weight of "fatty monoacids" or of standoils or standoil derivatives (standoil is a product resulting from the reaction at high temperature, 250-300° C., of a mixture of oil and of fatty acid), this weight % being expressed as a weight equivalent of triglyceride derivatives (oils) which correspond to the fatty acids b1.1), said fatty acids being "oxidizable". Any calculation and mention of this characteristic in the present invention is based on this definition. The term "oxidizable fatty acids" for b1.1) means, according to the present invention, the fatty acids or derivatives (oils or standoils) with an iodine number of greater than or equal to 80 mg of iodine per g of product. Said fatty monoacids or triglycerides (oils) may be mixtures of natural origin and may comprise up to 30% by weight of oxidizable saturated or unsaturated fatty acids b1.2).

The hydroxylated fatty polyester resin A) according to the present invention is in particular characterized by the presence in the acid component b) of the major component b2) bearing at least one carboxylic function and which is chosen from rosin and derivatives thereof, including maleic-treated or acrylic derivatives of rosin which may bear from 3 to 4 carboxylic functions.

According to a preferred embodiment, the polyester A) of the invention comprises less than 5%, preferably less than 3% by weight and more preferentially no (0%) aromatic compound such as of phthalic type (phthalic, isophthalic, trimellitic or terephthalic acid or anhydride), besides the rosin derivatives optionally used. The term "rosin derivatives" means natural derivatives such as dehydroabietic acid.

The oxidizable saturated or unsaturated fatty acids b1.2) used do not bear any reactive ethylenic unsaturation (i.e. if there is an unsaturation, it is not oxidizable) and may also be derived from the hydrogenation of unsaturated fatty acids b1.1), bearing at least one reactive unsaturation (oxidizable and hydrogenated). More particularly, said acid component b) may comprise b1.3) a mixture of at least two among said acid compounds b1.1) and b1.2).

The polyester resin A) according to another preferred case is based on an acid component comprising, in addition to said fatty acid b1), in addition to b2) said rosin and/or said rosin derivatives, at least one acid compound b3) bearing at least one carboxylic acid function and having an overall functionality of 2 to 3, the overall functionality including the acid function and an optional other possible function, such as hydroxyl, said compound b3) being chosen from: b3.1) saturated polyacids or b3.2) ethylenically unsaturated polyacids or b3.3) hydroxy acids.

As suitable saturated polyacid b3.1), the choice may be made from the acid and/or anhydride corresponding to: succinic acid, adipic acid, sebacic acid, dodecanedioic acid, citric acid (functionality 3), the $C_{36}$ fatty acid dimer (of functionality 2 to 2.2) or the $C_{54}$ fatty acid timer (of functionality 2.5 to 3). As suitable unsaturated polyacid b3.2), the choice may be made from the existing acid and/or anhydride corresponding to: itaconic acid of functionality 2, maleic or fumaric acid of functionality 2 or tetrahydrophthalic acid (THP) of functionality 2. Among the preferred polyacids, mention may be made of polyacids comprising at least one $C_{36}$ fatty acid dimer and/or $C_{54}$ fatty acid trimer. As preferred hydroxy acids b3.3), mention may be made of glycolic acid or lactic acid.

A combination of several polyacids and monoacids is often used in order to optimize the physicochemical properties of the polyurethane resin which results from polyester A) in particular the alkyd resin, more particularly to obtain the desired compromise of hardness/suppleness or flexibility. The incorporation into A) according to the invention, in particular into the alkyd resins, of aromatic acid derivatives such as phthalic (diacid/anhydride) or benzoic (monoacid) is possible, but, preferably, with a proportion of less than 5% by weight, and more preferentially with less than 3% by weight. Even more preferentially, there is no aromatic derivative (0% aromatics) outside of any natural rosin derivatives.

The presence of a monoacid component such as abietic or primaric acids, in particular of rosin and/or derivatives thereof, and more particularly in such a high proportion, constitutes the essential element of the structure of the polyester, in particular alkyd resin A) as defined according to the invention, for allowing the particular properties observed. The proportion of rosin in A) is high and ranges from 30% to 85%, preferably from 35% to 75%, more preferentially from 40% to 75% and even more preferentially from 45% to 75%. The fatty acids used, taking into account their natural origin, are mixtures as defined according to b1.3) comprising oxidizable saturated or unsaturated fatty acids b1.1) and unsaturated fatty acids b1.2) bearing non-conjugated unsaturations and conjugated unsaturations. These fatty acids, and also the fatty acid dimers and/or trimers synthesized from these same natural fatty acids, provide the suppleness and flexibility necessary for the binder and the coating obtained which results therefrom.

According to a preferred mode of the invention, the polyurethane resin of the invention is based on a fatty polyester A) in which said oxidizable fatty acid b1.1) is selected from fatty monoacids of plant or animal origin, preferably of $C_{16}$ to $C_{24}$, with a mean iodine number ranging from 100 to 200 mg $I_2$/g.

As regards the alcohol component a) of said polyol fatty polyester resin A), it may preferably comprise at least one polyol of functionality ranging from 2 to 10 and more preferentially from 2 to 6.

The polyols a) that are suitable according to the invention may be selected from: ethylene glycol, polyethylene glycol, preferably with a number-average molecular mass Mn (calculated from the OH number) ranging from 250 to 3000, propylene glycol (1,2-propanediol), 1,3-propanediol, dipropylene glycol, triethylene glycol, glycerol, diglycerol, trimethylolpropane or trimethylolethane, pentaerythritol, dipentaerythritol, sorbitol, mannitol, methyl glucoside, polyglycerol, in particular glycerol oligomers, such as polyglycerol-3 (glycerol trimer) and decaglycerol and preferably glycerol oligomers and mixtures thereof, such as polyglycerol-3, which polyglycerol-3 is a mixture of glycerol oligomers (glycerol oligomerized with the presence of oligomers containing 30% to 55% by weight of glycerol trimer constituting the predominant oligomer) this product being sold by Solvay. The preferred polyol is glycerol and/or pentaerythritol.

More particularly, said polyol a) may be selected from: ethylene glycol, polyethylene glycol, preferably of Mn from 250 to 3000, propylene glycol, 1,3-propanediol, dipropylene glycol, triethylene glycol, glycerol, diglycerol, trimethylolpropane (or -ethane), pentaerythritol, dipentaerythritol, sorbitol, mannitol, methyl glucoside and polyglycerol, in particular glycerol.

According to a preferred mode of the invention, said polyurethane resin and associated aqueous dispersion is based on a fatty polyester resin A), in which said polyacid b1.2) comprises at least one $C_{36}$ fatty acid dimer and/or $C_{54}$ fatty acid trimer and in that said polyol a) comprises glycerol or at least one glycerol oligomer and/or pentaerythritol and/or dipentaerythritol and preferably glycerol and/or pentaerythritol.

In the polyurethane resin according to the present invention, said acid function of said diol B) may be in a form neutralized (salified) with a neutralizing agent which is a weak base, preferably selected from tertiary amines, in particular trialkylamines or phosphines and more preferentially it is neutralized (salified) with tertiary amines. The neutralizing agent is a weak base, which means a basicity less than that of sodium hydroxide or of potassium hydroxide ($pK_a<14$).

According to a particular case, said polyurethane resin of the invention bears hydroxyl reactive groups, preferably with an OH number of at least 20, more preferentially of at least 40. They are in fact residual OH groups remaining after the reaction between the alcohol component comprising the polyol fatty polyester and the diol B) and the polyisocyanate C). In general, for the polyurethane resin, an excess of at least 5% of OH functions relative to the isocyanate functions NCO is used. In the particular case in which polyurethane resins with an OH number as indicated below are targeted, in this case, the excess of OH functions relative to the isocyanate functions is adjusted as a function of this number. The presence of these residual OH functions allows additional modification of the resin of the invention, but above all its crosslinking at a subsequent stage during its use in a final application of coating. The crosslinking may be performed with a suitable crosslinking agent (reactive relative to the hydroxyl functions and multifunctional, for instance melamine, and blocked or unblocked polyisocyanates.

The second subject of the invention relates to an organic binder composition which comprises at least one resin as defined according to the invention described above. This binder composition may comprise, in addition to the resin of the invention, at least a second resin different from the first, this second resin being selected from fatty acid-based polyester resins, preferably from modified alkyd resins. Among the modified alkyd resins that are suitable for this composition, mention may be made of alkyd resins modified with an acrylic structure, alkyd resins modified with styrene, modified with amides or modified with silicone.

Another subject of the invention relates to an aqueous dispersion of resin which comprises at least one polyurethane resin or at least one binder composition of the invention, preferably with said acid function of said diol B) being partially or totally neutralized with a weak base, preferably chosen from amines, in particular tertiary amines or phosphine, preferably tertiary amines and in particular trialkylamines such as triethylamine (TEA).

Preferably, said dispersion has a solids content ranging from 20% to 60% and preferably from 30% to 50% and a mean particle size ranging from 30 to 200 nm.

More particularly, it may be free of any organic solvent with a corresponding VOC content of less than 5000 ppm, preferably less than 1000 ppm and more preferentially less than 500 ppm.

This aqueous resin dispersion according to the invention may comprise a mixture of dispersions, with at least a first aqueous resin dispersion according to the invention and with at least a second resin dispersion different from the first, this second resin dispersion being selected from optionally modified alkyd resin dispersions, acrylic dispersions (or emulsions) (including styrene-acrylics) or dispersions of other polymers and in particular polyurethane or saturated or unsaturated polyester dispersions. In this case, the weight content of said first dispersion may range from 50% to 99.5% relative to said mixture.

A more particular case of an aqueous dispersion according to the invention is that in which said dispersion comprises a polyurethane resin bearing OH groups with an OH number of at least 20 and more preferentially of at least 40. Such a dispersion may be used in particular for aqueous compositions of crosslinkable coatings in the presence of a multifunctional crosslinking agent bearing functions that are reactive with OH groups. A suitable example of such a crosslinking agent is melamine, blocked or unblocked polyisocyanates.

The invention next relates to a process for preparing said polyurethane resin and more particularly in the form of an aqueous dispersion. By definition, this also relates to a process for preparing said aqueous dispersion.

This process for preparing a resin of the invention, in the form of an aqueous dispersion, comprises at least the following successive steps:

i) preparing a (fatty) polyol polyester A) as defined above, by bulk polycondensation reaction in the melt of said alcohol a) and acid b) components, until an acid number of less than 10 is obtained, ii) dissolution and dilution of said polyester in a volatile solvent (with a boiling point of less than 150° C., preferably less than 100° C.), iii) polyaddition reaction in solvent medium of said polyester A) as obtained in step ii) by addition of said diol B) and of said polyisocyanate, preferably diisocyanate C), with partial or total neutralization of said acid function of B) with a weak base chosen from amines or phosphines, preferably amines, in particular tertiary amines, said neutralization possibly taking place prior to or subsequent to said polyaddition, iv) at the end of the reaction of step iii), dispersion in water with stirring of the polyurethane solution as obtained in step iii), before v) removal of said organic solvent by evaporation or by steam stripping or by an inert gas-stripping.

The use of the polyurethane resins and of the aqueous dispersions based on these resins of the invention are suitable in particular for applications in aqueous coatings.

Thus, the invention relates more particularly to an aqueous coating composition which comprises as binder at least one resin or at least one binder composition or at least one aqueous dispersion as defined above according to the invention. These compositions are distinguished from the prior art in terms of applicative performance qualities, more particularly as regards the faster development of hardness and the rapid physical drying and with a development of yellowing that is reduced and controlled over time. The coatings resulting therefrom have additional performance qualities, including: abrasion resistance, good flexibility, blocking resistance, adhesion and mechanical strength. Given the particular adhesion of the polyurethane resins to a metal substrate and the barrier effect characterized by the high hydrophobicity/hardness of the rosin-based binder, this type of binder gives the final coating particularly efficient anticorrosive properties. This is an application targeted in particular for the aqueous coatings based on polyurethane resin of the present invention. The other advantage due to the chemical composition of the resin is that this binder is highly bio-based.

According to a more particular case, said coating composition of the invention is crosslinkable and comprises at least one aqueous dispersion of polyurethane resin according to the present invention comprising hydroxyl groups (residual from the reaction with said polyisocyanate), preferably with an OH number of at least 20, more preferentially of at least 40 and said dispersion also comprises at least one crosslinking agent that can react with said hydroxyl functions, said crosslinking agent preferably being selected from: melamine, blocked or unblocked polyisocyanate, epoxy and silane.

The coating composition of the invention is more particularly used for aqueous coatings such as adhesives, paints, surface coatings, primers and varnishes. According to a particular preferred embodiment, these compositions have a reduced content of siccatives and more preferentially they are free of siccatives such as heavy metal salts, for instance cobalt or tin salts and more particularly they do not contain any siccative.

Finally, the invention relates to a substrate coating as obtained from at least one resin or a binder composition or an aqueous dispersion as defined above according to the invention.

The invention is illustrated without limitation of coverage by the examples presented below.

EXPERIMENTAL SECTION

1) Preparation of a Polyol Fatty Polyester Resin A) and Characteristics

Example 1

Said polyester A) is formed by "one-pot" condensation at 230-250° C. of a mixture composed of glycerol, fatty acid dimer (Pripol® 1017 sold by Croda) and rosin in the following mass proportions (see table 1):

TABLE 1

| composition of the reagents | | |
|---|---|---|
| Components | Supplier | Parts by weight |
| Pripol ® 1017 (fatty acid dimer) with $I_A$: 195-210 Oxidizable unsaturation: 0 | Croda | 540.8 |
| Glycerol | Solvay | 197.9 |
| Rosin (gum rosin) | Ter-Hell & Co GMBH | 759.4 |

The condensation is stopped so as to obtain a final viscosity of 70 Pa·s (measured at 110° C. using a CAP 1000 viscometer) with an acid number of less than 10 mg KOH/g (between 6 and 8).

Calculated characteristics of resin A):
$I_{OH}$: 90 mg KOH/g (calculated by the excess OH)
$I_A$: 6 mg KOH/g (method ISO 2114)
% rosin: 50% oil length: 40%
oxidizable unsaturation: 0 mg $I_2$/g
Mn: calculated from the $I_A+I_{OH}$ data and functionality: 1140 g/mol (for $I_A$=6 mg KOH/g, $I_{excess\ OH}$=90 mg KOH/g and functionality=1.58).

2) Preparation of an Aqueous Dispersion of Polyurethane Resin (and Indirectly of the Polyurethane Resin)

Polyester A) as described in example 1 above is diluted in acetone so as to be polyurethane-modified therein in the presence of isophorone diisocyanate (IPDI), dimethylolpropionic acid (DMPA) and triethylamine (TEA), and the product is then finally dispersed in water after virtually complete reaction of the isocyanate functions. The proportions are indicated in table 2 and the procedure is detailed below.

TABLE 2

| Composition of reagents for the preparation of the polyurethane resin according to the invention | | | |
|---|---|---|---|
| Starting material | Supplier | Moles | Parts by weight (g) |
| Polyester A) of example 1 | According to example 1 | / | 352.00 |
| DMPA | Perstorp | 0.161 | 21.60 |
| Acetone 1 | VWR | / | 197.50 |
| TEA | Aldrich | 0.197 | 20.00 |
| IPDI | Rhodia | 0.339 | 75.40 |
| Acetone 2 | VWR | | 93.00 |
| Water | | / | 600.00 |

Detailed Procedure:

Acetone (portion 1: i.e. 197.5 g) and then DMPA and TEA are introduced with mechanical stirring onto the molten polyester A) described in example 1, at between 50 and 60° C. The medium is then refluxed for 45 minutes at about 54° C., and IPDI is then introduced rapidly in a single portion. The urethanization reaction (formation of polyurethane) is monitored by FTIR (Fourier Transform InfraRed) until a conversion of the isocyanate functions (NCO) of about 94% is obtained. Acetone (portion 2:93 g) is then added to the medium, and water is then introduced over 10 minutes at between 35° C. and 40° C. The acetone (and part of the water) is then evaporated off at atmospheric pressure at 55-60° C. and while sparging with nitrogen until a final solids content of about 40% by weight is obtained. The polyurethane resin dispersion (PUD) is then filtered off on a 25 micron gauze.

The characteristics of the final dispersion are given in table 3 below.

TABLE 3

| Characteristics of the final dispersion | |
|---|---|
| Characteristic | Value |
| $I_{OH}$ (mg KOH/g) | 26 |
| pH | 8-9 |
| Malvern particle size (nm) | 70 |
| Brookfield viscosity DVII+ at 25° C./100 rpm (mPa · s) | 150 |

3) Results and Performance Qualities on Coatings

Development of Hardness Over Time

The hardness evaluation is performed on films obtained by application to a glass plate of a coat of aqueous resin dispersion of example 2 with a wet thickness of 100 μm.

The hardness test is according to method ISO 1522. It is a pendulum hardness (Persoz) performed at 23° C. and at 50% relative humidity. The varnishes are applied to a wet thickness of 100 μm and then dried on a perfectly horizontal surface at 23° C. and at a relative humidity of 50% for 24 hours before the first measurement.

The results obtained are presented in the form of graphs compared in FIGS. 1 and 2, in which the performance qualities of the dispersion according to the invention of example 2 are compared with those of a commercial dispersion WorleeSol® E 150 W sold by Worlee representing the prior art (siccative-treated and non-siccative-treated).

FIG. 1 shows the strictly comparative drying, obtained under the same test conditions, without addition of siccative (such as cobalt derivatives). The essential characteristic of the product of the invention, which emerges from this comparison, is its capacity to physically dry and to harden very rapidly from within the first hours of application. According to the graph of FIG. 1, the resin dispersion according to example 2 of the invention compared with WorleeSol® E 150 W dries and hardens much more rapidly and above all more intensely than the reference product representing the prior art. The product according to the invention achieves more than 85% of its hardness potential after only 1 hour of application, and without addition of siccative.

FIG. 2 shows, spectacularly, that the resin dispersion according to the invention of example 2, even when not siccative-treated, once again remains superior to the reference commercial resin dispersion siccative-treated with cobalt (Additol® VXW 6206 sold by Cytec, added to 1.5% by weight on dry resin).

The other advantages are: the lower level of yellowing with the same performance with or without addition of siccative.

The invention claimed is:

1. A linear or branched polyurethane resin derived from fatty polyester, wherein said polyurethane resin is derived from at least one hydroxylated fatty polyester A), and wherein:
   said polyester A) is the product of reaction of a) an alcohol component with b) an acid component, which acid component b) comprises b1) at least one fatty acid, said fatty acid being chosen from the group consisting of b1.1) at least one oxidizable fatty monoacid and/or polyacid, comprising at least one oxidizable unsaturation, b1.2) at least one non-oxidizable fatty monoacid and/or polyacid, and b1.3) at least one mixture of fatty acids b1.1) and b1.2),
   said component b) further comprising b2) rosin and/or rosin derivatives bearing at least one carboxylic acid function, said rosin and/or derivatives b2) representing from 30% to 85% by weight relative to the total weight of the hydroxylated fatty polyester A)
   optionally, said polyester A) having a zero oil length (0%) or an oil length of between 0 and 60%,
   optionally, said polyester A) having a weight ratio of oxidizable fatty acids (monoacids) b1.1) relative to the overall fatty acids b1.1)+b1.2) of 0 or greater than 0 and up to 1,
and with said resin being the product of reaction of said polyol polyester A) with:
   B) at least one diol comprising an acid functional group, chosen from the group consisting of carboxylic, sulfonic, phosphonic or phosphinic, said acid functional group optionally being neutralized to salt form with a weak base, and
   C) at least one polyisocyanate, of functionality from 2 to 3.

2. The resin of claim 1, wherein said acid component b) comprises, said fatty acid b1), said rosin and/or said rosin derivatives b2), and at least one acid compound b3, with b3) having at least one carboxylic acid function and optionally with an hydroxyl function and an overall functionality of 2 to 3, with b3) being chosen from the group consisting of b3.1) saturated polyacids, b3.2) ethylenically unsaturated polyacids, and b3.3) hydroxy acids.

3. The resin as claimed in claim 1, wherein said acid compound b1) is a non-oxidizable fatty polyacid b1.2).

4. The resin as claimed in claim 1 wherein said alcohol component a) comprises at least one polyol of functionality ranging from 2 to 10.

5. The resin as claimed in claim 4, wherein said polyol is selected from the group consisting of: ethylene glycol, polyethylene glycol, propylene glycol, 1,3-propanediol, dipropylene glycol, triethylene glycol, glycerol, diglycerol, trimethylolpropane, trimethylolethane, pentaerythritol, dipentaerythritol, sorbitol, mannitol, methyl glucoside, and polyglycerol.

6. The resin as claimed in claim 1 wherein said polyester A) has an acid number of less than 10, an OH number of greater than 25, and a calculated number-average molecular weight Mn ranging from 250 to 10 000 (g/mol).

7. The resin as claimed in claim 1 wherein said oxidizable fatty acid b1.1) is selected from fatty monoacids of plant or animal origin, with a mean iodine number from 100 to 200 mg $I_2$/g.

8. The resin as claimed in claim 1 wherein said polyacid b1.2) comprises at least one $C_{36}$ fatty acid dimer and/or a $C_{54}$ fatty acid trimer and wherein said alcohol component a) comprises glycerol or at least one glycerol oligomer and/or pentaerythritol and/or dipentaerythritol.

9. The resin as claimed in claim 1 wherein said acid function of said diol B) is in a form neutralized (salified) with a weak base selected from the group consisting of tertiary amines and phosphines.

10. The resin as claimed in claim 1 comprising hydroxyl reactive groups.

11. An organic binder composition comprising at least one resin as defined according to claim 1.

12. The composition as claimed in claim 11, further comprising at least a second resin different from the first, this second resin being selected from the group consisting of resins of polyesters based on fatty acids.

13. An aqueous resin dispersion, comprising at least one polyurethane resin of claim 1.

14. The dispersion as claimed in claim 13, having a solids content ranging from 20% to 60% and a mean particle size ranging from 30 to 200 nm.

15. The dispersion as claimed in claim 13 that is free of organic solvent with a corresponding VOC content of less than 5000 ppm.

16. An aqueous resin dispersion comprising a mixture of at least a first aqueous resin dispersion of claim 13 and at least a second resin dispersion different from the first, the second resin dispersion being selected from the group consisting of alkyd resin dispersions, acrylic dispersions, acrylic emulsions, styrene-acrylic emulsions, polyurethane dispersions, polyester dispersions.

17. The dispersion as claimed in claim 16, wherein the weight content of said first dispersion is from 50% to 99.5% relative to said mixture.

18. The aqueous dispersion as claimed in claim 13 wherein said resin comprises hydroxyl reactive groups.

19. A process for preparing a resin according to claim 1 in the form of an aqueous dispersion, comprising the following successive steps:
   i) preparing a polyol polyester A) as defined in claim 1, by bulk polycondensation reaction in the melt of said alcohol a) and acid b) components, until an acid number of less than 10 is obtained,
   ii) dissolution and dilution of said polyester in a volatile solvent with a boiling point of less than 150° C.,
   iii) polyaddition reaction in solvent medium of said polyester A) as obtained in step ii) by addition of said diol B) and of said polyisocyanate, with partial or total neutralization of said acid function of B) with a weak base chosen from the group consisting of amines and phosphines,
   iv) at the end of the reaction of step iii), dispersion in water with stirring of the polyurethane solution as obtained in step iii), before
   v) removal of said organic solvent by evaporation or by steam-stripping or by an inert gas stripping.

* * * * *